United States Patent [19]

Isozumi

[11] Patent Number: 4,941,366

[45] Date of Patent: Jul. 17, 1990

[54] COAXIAL TYPE STARTER DEVICE

[75] Inventor: Shuzoo Isozumi, Himeji, Japan

[73] Assignee: Mitsubishi Denki Kabushiki Kaisha, Tokyo, Japan

[21] Appl. No.: 337,789

[22] Filed: Apr. 13, 1989

[30] Foreign Application Priority Data

Apr. 13, 1988 [JP] Japan ............................ 63-50276[U]
Apr. 26, 1988 [JP] Japan ............................ 63-104707

[51] Int. Cl.[5] ........................ F02N 15/02; F16D 43/00

[52] U.S. Cl. ........................ 74/6; 74/7 R; 123/179 M

[58] Field of Search ............... 74/6, 7 R, 7 C; 192/45, 192/106.1; 123/179 M

[56] References Cited

U.S. PATENT DOCUMENTS

| | | | |
|---|---|---|---|
| 2,455,328 | 11/1948 | Buxton | 74/7 A |
| 3,465,353 | 9/1969 | Buxton et al. | 74/7 R |
| 3,616,700 | 11/1971 | Patchett | 74/7 R |
| 3,771,372 | 11/1973 | Asahi et al. | 74/7 R |
| 4,020,935 | 5/1977 | Mortensen | 74/6 |
| 4,197,885 | 4/1980 | Mortensen | 192/45 |
| 4,261,452 | 4/1981 | Barrows | 74/6 |
| 4,304,140 | 12/1981 | Ebihara | 192/45 |
| 4,325,265 | 4/1982 | Wakatsuki et al. | 74/7 R |
| 4,366,385 | 12/1982 | Williams | 123/179 M |
| 4,464,576 | 8/1984 | Williams | 123/179 M |
| 4,494,414 | 1/1985 | Hamano | 74/7 E |
| 4,613,761 | 9/1986 | Yabunaka | 290/36 R |
| 4,707,616 | 11/1987 | Ogle et al. | 74/6 |
| 4,760,274 | 7/1988 | Isozumi | 74/7 A |

FOREIGN PATENT DOCUMENTS

| | | | |
|---|---|---|---|
| 975994 | 10/1975 | Canada | 74/6 |
| 1311876 | 11/1962 | France . | |
| 59-32670 | 2/1984 | Japan | 74/7 R |

*Primary Examiner*—Rodney H. Bonck
*Assistant Examiner*—Scott Anchell
*Attorney, Agent, or Firm*—Sughrue, Mion, Zinn, Macpeak and Seas

[57] ABSTRACT

A coaxial type starter includes an overrunning clutch constructed to absorb external laods applied to the output shaft 5 through the pinion 8. In a first embodiment a moving tube 14 is disposed between a clutch inner 12 and the output shaft, and has helical splines in both surfaces thereof with their respective rotational directions reversed so that the tube is driven inwardly against an elastic absorber 16 when an external load is applied. A second embodiment is provided with an output shaft stopper 12D on the clutch inner itself, so that a forwardly moving force thereof is absorbed by an elastic body disposed between a projection 12C on the clutch inner and a bearing 15.

3 Claims, 4 Drawing Sheets

COAXIAL TYPE STARTER DEVICE

BACKGROUND OF THE INVENTION

1. Field of the Invention

The present invention relates to a coaxial type starter device, and more particularly to a coaxial device for starting the engine of a vehicle and using an improved over-running clutch device.

2. Prior Art

The conventionally used starter device for starting the engine of a vehicle is a so-called a two-shaft structure, wherein an electromagnetic device for energizing a DC motor is arranged on a side of the DC motor. However, such a two-shaft type starter device imparts a great restriction to a layout of the engine when a vehicle is designed. Therefore, a proposal has been made in which an electromagnetic switching device is arranged on one end in an axial direction of a DC motor, so that the starter device can be formed into a simple configuration such as a mere elongated tubular body.

According to the aforementioned proposal, a coaxial type starter device using an overrunning clutch device as shown in FIG. 6 has been designed. This coaxial type starter device 1 is constructed in such a manner that an armature rotational shaft 3 of a DC motor 2 is made to be hollow, a plunger rod 4*a* of an electromagnetic switching device 4 arranged at the rear end of the DC motor 2 is inserted into an internal passage 3*a* of the armature rotational shaft 3, and the rod 4*a* is brought into contact with the rear end of an output rotational shaft 5 which is arranged coaxially with the armature rotational shaft 3 and having the rear end thereof inserted into the internal passage 3*a* so that the output rotational shaft 5 may be forwardly forced out.

In such a coaxial type starter device 1, the rotational of the armature rotational shaft 3 is reduced in speed by means of a planet gear unit 6, comprising a sun gear 6*a* meshed with a plurality of planet gears 6*b* which are further meshed with an internal gear 6*c* provided on the inner peripheral surface of a frame 9 and also supported on a carrier 6*e* through shafts 6*d*. The reduced rotation is further transmitted to the output rotational shaft 5 through an overrunning clutch device 7 to rotate a pinion 8 mounted on the front end of the output rotational shaft 5. The conventional overrunning clutch device 7 is provided with a clutch outer or race 7*a* rotated by the reduced turning force, and a plurality of cam surfaces are formed at equal intervals in the inner peripheral surface of the clutch outer 7*a*, which cooperates with the outer peripheral surface of a tubular clutch inner or race 7*b* arranged internally of the clutch outer 7*a* to define wedge-shaped spaces. A roller 7*c* is arranged in each wedge-shaped space so that when the clutch outer 7*a* is rotated in a predetermined direction, the roller 7*c* rolls into frictional engagement with the cam surface, whereby the clutch inner 7*b* is connected to the clutch outer 7*a* and the rotation is transmitted.

The output rotational shaft 5 is inserted internally of the clutch inner 7*b* whose inner peripheral surface is provided with a helical spline 7*d* formed along the rotational direction of the output rotational shaft 5 so as to be meshed with a spline forming portion 5*a* having a larger outside diameter than the inside diameter of the internal passage 3*a* of the armature rotational shaft 3. Thereby the output rotational shaft 5 can receive the turning force from the clutch inner 7*b*, and a pinion 8 at the front end portion of the output rotational shaft 5 activates the ring gear of the engine to rotate when the output rotational shaft 5 is moved in an axial direction thereof.

In such an overrunning clutch device 7, in starting the engine, when the output rotational shaft 5 is conversely rotated at high speed by the engine, the clutch inner 7*b* is rotated at higher speed than the clutch outer 7*a*, and therefore, the frictional engagement thereof with the clutch outer 7*a* by way of the roller 7*c* is released to cut off the reverse transmission to the clutch outer 7*a*.

The conventional overrunning clutch device 7 having been designed as described above poses a problem in that when the output rotational shaft 5 receives a high load including shocks produced due to a change in pulse-like load generated when the pinion 8 is thrust into engagement with a rotating ring gear, for example, when starter device is actuated when the engine already operating, the ring gear as well as various components are liable to be damaged since such load is only absorbed as a distorted energy generated by a torsion rigidity produced through the above clutch inner, clutch outer and the roller.

SUMMARY OF THE INVENTION

The present invention overcomes these problems noted above with respect to the prior art. It is an object of the present invention to provide a coaxial type starter device provided with an over-running clutch device having a means for lightening and absorbing a high load such as a shock load applied to a rotational shaft.

The present invention with the above object can be completed in two main embodiments, the detailed description of each being explained below.

A first embodiment of the coaxial type starter device according to the present invention comprises a clutch outer formed in an inner peripheral surface thereof with a plurality of cam surfaces at equal intervals, a clutch inner arranged internally of the cluch outer to cooperate with the cam surfaces to defice wedge-shaped spaces, a roller arranged each wedge-shaped space and movable in a peripheral direction, a moving tube arranged internally of the clutch inner and an elastic body for receiving a moving force in an axial direction of the moving tube, wherein the moving tube comprises a first helical spline formed in its inner peripheral surface so as to mesh with an output rotational shaft inserted thereinto and a second helical spline, whose torsional direction is reversed to that of the first helical spline, formed in its outer peripheral surface so as to mesh with the clutch inner, characterized in that the elastic body is elastically deformed by the moving force of the moving tube caused by a reaction received when a turning force of the output rotational shaft is transmitted to external devices.

According to the above construction, when the high load is applied to the output rotational shaft, a force for moving the moving tube brackwards is produced by the engagement between the output rotational shaft and the moving tube by way of the first helical spline. At this time, the moving tube is applied with the turning force from the electric motor by the clutch inner, and the force for moving the moving tube backwards is generated by the turning force as the result of the engagement by the second helical spline provided in the reverse direction. Thereby, the moving tube is moved backwards, and this moving force is received by the elastic body and the shock is lightened and absorbed.

A second embodiment of the coaxial starter device according to the present invention comprises an armature rotational shaft slidably supported in the axial direction and provided with a pinion on the front end thereof and arranged on one and the same axis, wherein a rotation of the armature rotational shaft is transmitted to the output rotational shaft through an overrunning clutch device, characterized in that a stopper to stop the forwarding movement of the output rotational shaft is formed in a clutch inner of the overrunning clutch device which is engaged with the output rotational shaft by the helical spline thereof and the same time a stop portion is formed in the outer periphery of a forwardly extended portion of the clutch inner, and also an elastic body is further arranged between the stop portion and a bearing which is engaged with a frame of the clutch device and supporting the extended portion of the clutch inner.

According to the above construction, when the output rotational shaft receives the high load, the output rotational shaft engaged with the clutch inner of the overrunning clutch device by the helical spline thereof tends to further move forward. By the moving force, the clutch inner tends to move forward through the stopper formed in the clutch inner. This forward moving force of the clutch inner is received by the elastic body arranged between the stop portion and the bearing. Thereby, the shock load applied to the output rotational shaft is lightened and absorbed.

The features of the invention will be more fully understood from the following description and appended claims when examined in accordance with the accompanying drawings.

DETAILED DESCRIPTION OF THE EMBODIMENTS

The first embodiment of the coaxial type starter device according to the present invention will be first described hereinafter with reference to the accompanying drawings.

Figure 1:
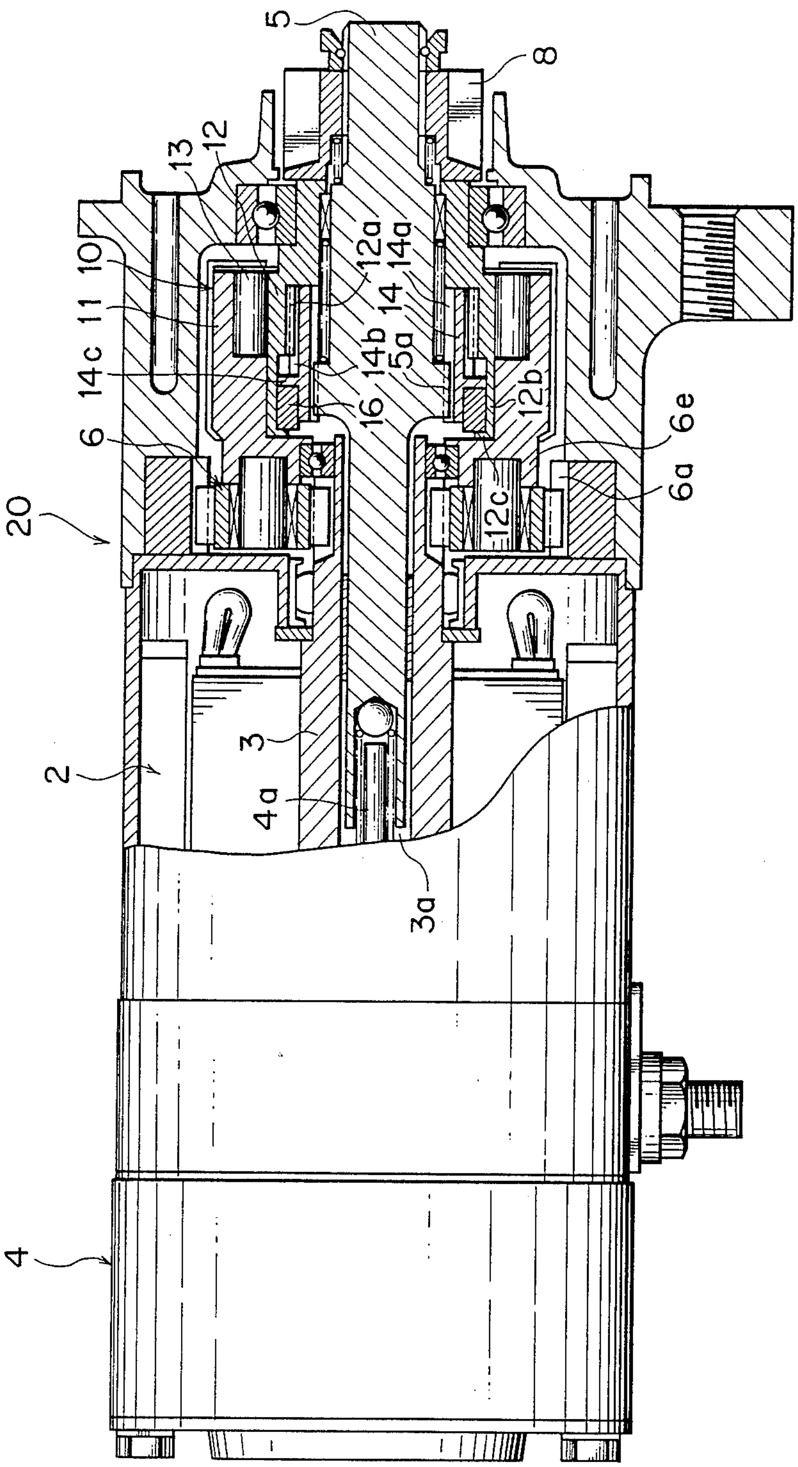
FIG. 1 is a sectional view of a coaxial starter device using an overrunning clutch device according to the first embodiment of the present invention.
Figure 6:
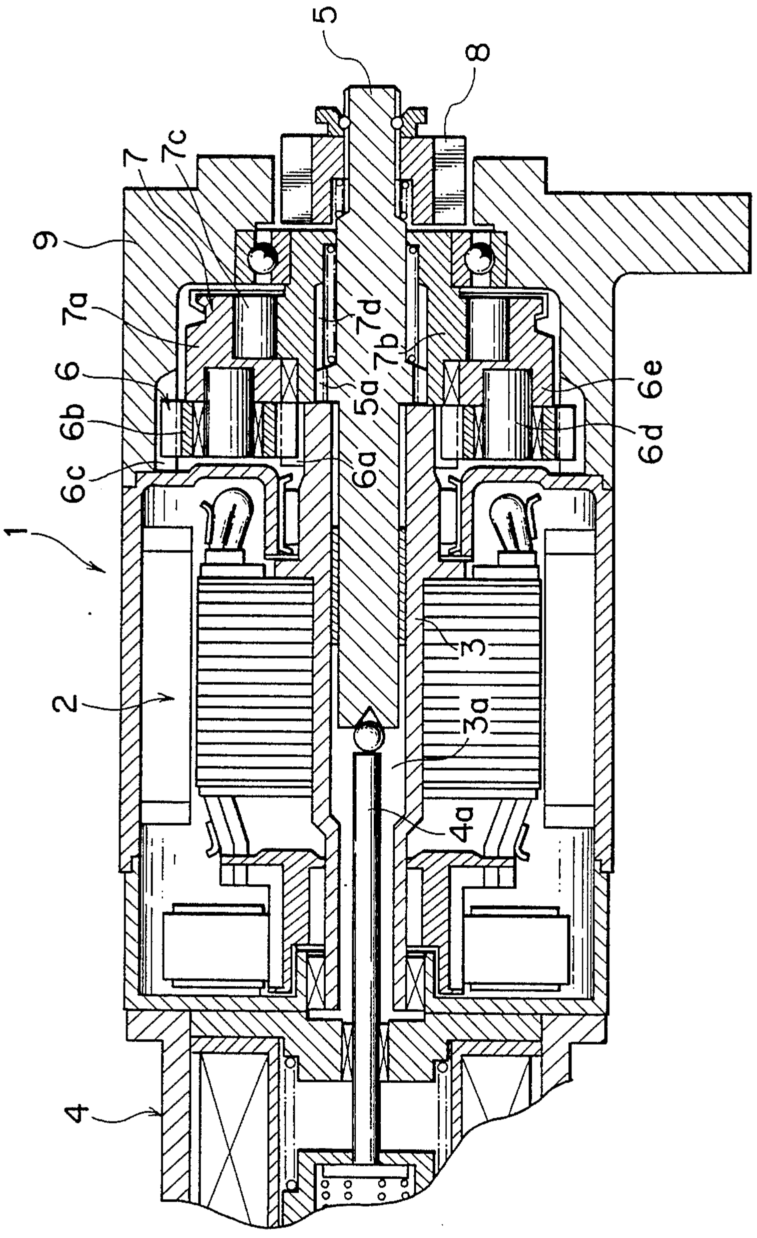

A coaxial type starter device 20 using an overrunning clutch device 10 according to the first embodiment of the present invention is shown in FIG. 1. In FIG. 1, the parts identical with or corresponding to those shown in FIG. 6 are indicated by the same reference numerals and the explanation thereof will be omitted.

In the coaxial type starter device 20 shown in FIG. 1, the rotation of an armature rotational shaft 3 in a DC motor 2 is reduced in speed by a planet gear unit 6 and transmitted to an output rotational shaft 5 through an overrunning clutch device 10 in a manner similar to a conventional starter device 1.

The overruning clutch device 10 is provided with a clutch outer 11 formed integral with a carrier 6e supporting planet gears 6a of the planet gear unit 6, and a plurality of cam surfaces are formed at equal intervals in the inner peripheral surface of the clutch outer 11 to cooperate with the outer peripheral surface of a tubular clutch inner 12 arranged internally of the clutch outer 11 to define wedge-shaped spaces. A roller 13 is arranged in each wedge-shaped space. When the clutch outer 11 is rotated in a predetermined direction, the rollers 13 roll into frictional engagement with the cam surfaces and the cluth inner 12 is connected to the clutch outer 11 to transmit the rotation.

Figure 2:
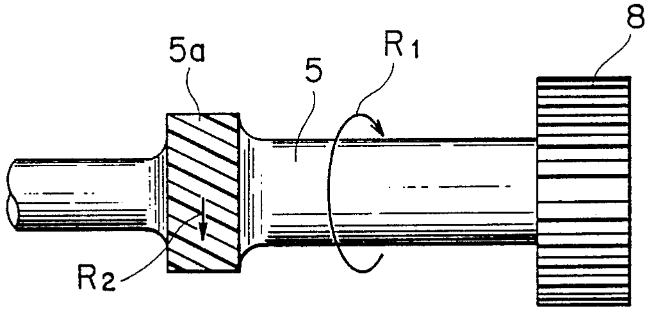
FIG. 2 is a front view showing an output rotational shaft of the coaxial type starter device shown in FIG. 1.
Figure 3:
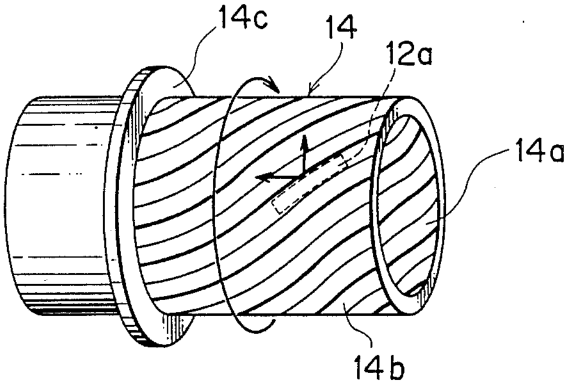
FIG. 3 is a perspective view schematically showing a moving tube of the overrunning clutch device shown in FIG. 1.

A traversal tube 14 as shown in FIG. 3 is arranged internally of the clutch inner 12, and an output rotational shaft 5 is inserted thereinto. The traversal tube 14 and the output rotational shaft 5 are meshed to each other by a first helical spline 14a formed in the inner peripheral surface of the trasversal tube 14 for spiraling the shaft 5 in a direction from the front side (the pinon 8 side) thereof towards the rear side and by a toothed portion 5a formed in the outer peripheral of the output rotational shaft 5 as shown in FIG. 2. Accordingly, the output rotational shaft 5 can be moved in an axial direction and is able to receive a turning force from the transversal tube 14.

On the other hand, the traversal tube 14 and the clutch inner 12 are meshed each other by a second helical spline 14b, whose torsional direction is reversed to that of the first helical spline 14a, formed in the outer peripheral surface of the traversal tube 14 (forward from a projecting portion 14c described later) and by a toothed portion 12a formed in the inner peripheral surface of the clutch inner 12. Accordingly, the traversal tube 14 can be moved in an axial direction while receiving a turning force from the clutch inner 12.

The projecting portion 14c is fixedly mounted on the outer peripheral surface rearwardly of the traversal tube 14, and an elastic boby 16 such as rubber, is arranged between the projecting portion 14c and a flange portion 12c inwardly projecting at the rear end of a tubular portion 12b integrally extended rearward from the clutch inner 12.

The operation of the coaxial starter device 20 constructed as described above will be described hereinafter.

When the electromagnetic switching device 4 is actuated and the rod 4a is moved forward, the output rotational shaft 5 is forced forward, and the DC motor 2 is starter at the same time when the pinion 8 comes into contact with the end of the toothed portion of the ring gear (not shown) of the engine, so that the rotation of the armature rotational shaft 3 is reduced in speed by the planet gear unit 6, and transmitted from the clutch outer 11 of the overrunning clutch device 10 to the clutch inner 12, then from the clutch inner 12 to the traversal tube 14 and further from the traversal tube 14 to the output rotational shaft 5 (which is rotated in a direction as indicated by arrow R1 in FIG. 2) to rotate the pinion 8. When the pinion 8 is rotated in mesh with the ring gear, the ring gear is activated to rotate and start the engine.

This is the normal operation in the coaxial starter device 20, but the pinion 8 sometimes receives a great reaction (load) from the ring gear due to various causes such as a pulse-like movement of the engine, etc. during the rotation of the ring gear. In this case, this reaction is applied to the first helical spline 14*a* in the inner peripheral surface of the traversal tube 14 in a direction indicated by arrow R2 (in a direction reversed to the rotation of the output rotational shaft 5) from the tooth portion 5*a* formed in the output rotational shaft 5, and therefore, the traversal tube 14 receives a retreating force (a moving force in a backward direction) according to the torsional direction of the helical spline 14*a*.

On the other hand, the turning force transmitted from the DC motor 2 to the clutch inner 12 is applied from the toothed portion 12*a* in the inner peripheral surface of the clutch inner 12 to the second helical spline 14*b* in the outer peripheral surface of the traversal tube 14. At this time, the second helical spline 14*b* receives a torsion in a direction reversed to the first helical spline 14*a* as shown in FIG. 3, and therefore, the traversal tube 14 still receives a retreating force.

As a result, a retreating force caused by a counter-rotational torque received from the ring gear and another retreating force caused by a rotational torque from the motor nad imparted to the traversal tube 14 are received by the elestic body 16. Thereby, a high load such as a shock load applied to the output rotational shaft 5 is converted into a retreating force of the traversal tube 14, which force is received by the elastic body 16 to lighten and absorb it.

Preferably, the first helical spline 14*a* formed in the inner peripheral surface of the moving tube 14 and the second helical spline 14*b* in the reverse direction formed in the outer peripheral surface have the same torsional angle against the center axis.

Needless to say, the elastic body 16 may be formed by a leaf spring or similar spring other than the rubber body as mentioned.

According to the above construction, the traversal tube is interposed between the clutch inner and the output rotational shaft, so that the clutch inner and the traversal tube and the traversal tube and the output rotational shaft are meshed to one another by helical splines mutually reversed in direction and respectively formed in the inner and outer peripheral surfaces of the moving tube, whereby the reaction received when the turning force of the output rotational shaft is transmitted to external devices is converted into a moving force of the traversal tube, and the moving force is received by the elastic body. Thus, high loads such as a shock load or the like applied to the output rotational shaft can be lightened and absorbed. Therefore, it is possible to provide an overrunning clutch device with a durability caplable of preventing damages to the gears of external devices that transmit the rotation of the output rotational shaft as well as to various components thereof. Next, the second embodiment of the coaxial type starter device according to the present invention will be described with reference to the drawings.

Figure 4:
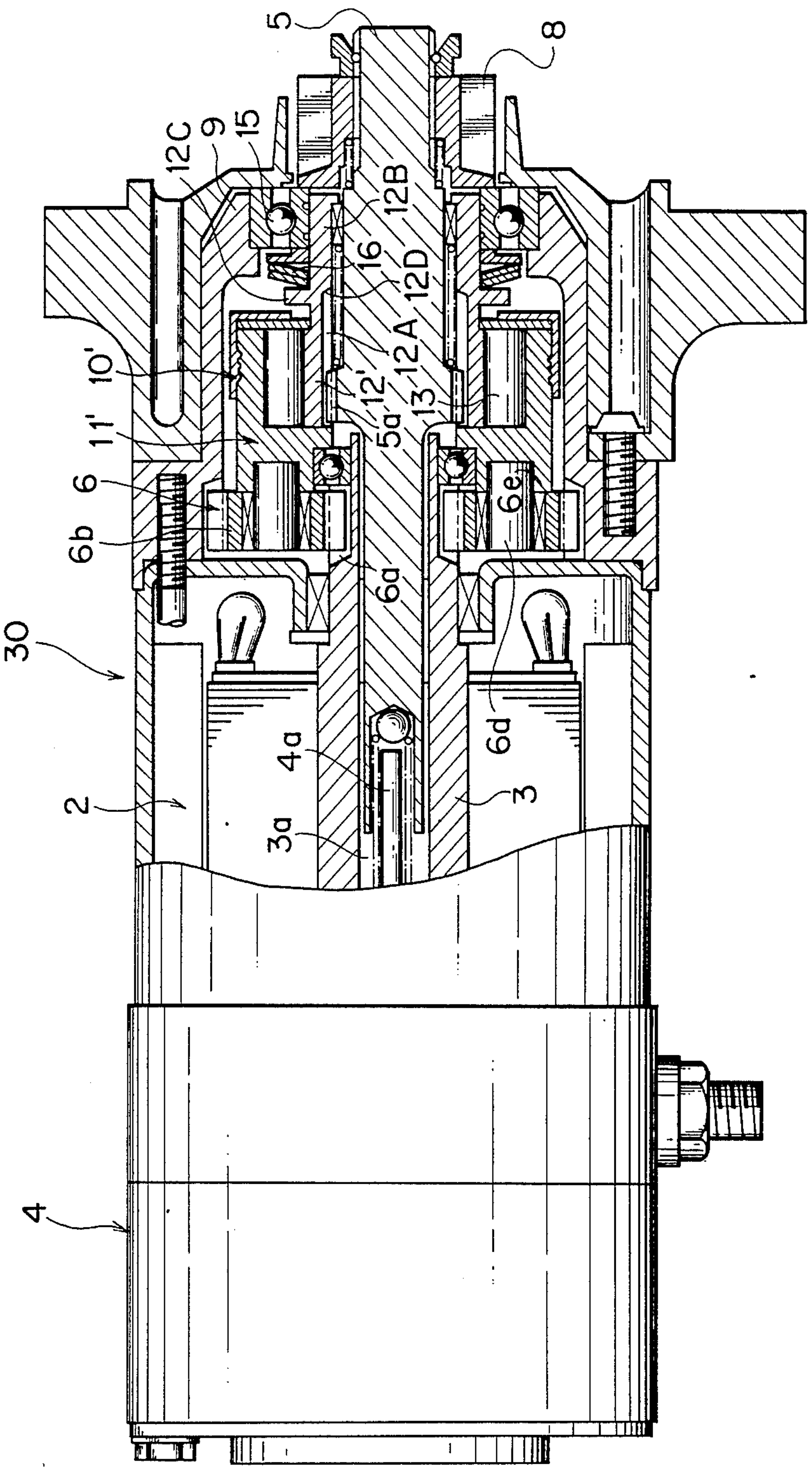
FIG. 4 is a sectional view showing a coaxial type starter device according to the second embodiment of the present invention.

FIG. 4 is a sectional view showing a coaxial type starter device according to the second embodiment of the present invention, and the parts identical with or corresponding to those shown in FIG. 6 are indicated by the same reference numerals, omitting the explanation thereof.

In a coaxial type starter device 30 according to the second embodiment as shown in FIG. 4, the rotation of an armature rotational shaft 3 of a DC motor 2 is reduced in speed by a planet gear unit 6, and transmitted from a clutch outer 11′ of an overrunning clutch device 10′ through roller 13, and then transmitted to a helical spline 12A formed in the inner peripheral surface of the clutch inner 12′ and finally to an output rotational shaft 5 engaged with a spline forming portion 5*a*.

The clutch inner 12′ is provided with a forwardly extending portion 12B integrally extended forwardly (rightward as viewed in FIG. 4) thereof, and the front end of the portion 12B is rotatably supported by a bearing 15 engaged with a front frame 9 of the starter device 30. The forwardly extending portion 12B is provided with a projecting portion which functions as a stop portion 12C in the outer peripheral portion thereof, and an elastic body 16 formed by a leaf spring is arranged between the stop portion 12C and the bearing 15.

On the other hand, the front end of the helical spline 12A provided in the inner peripheral surface of the clutch inner engaged with a spline forming portion 5*a* of the output rotational shaft 5 is fomed as a stopper 12D which comes into contact with the spline forming portion 5*a* so as to move forward with the output rotational shaft 5 and to stop at a position in which the pinion 8 is meshed with the ring gear of the engine. In other words, when the output rotational shaft 5 is forced forward by the plunger rod 4*a* of the electromagnetic switching device 4, it stops moving when the spline forming portion 5*a* thereof comes into contact with the stopper 12D at the front end of the helical spline groove of the clutch inner 12′ at which position the pinion 8 is meshed with the ring gear of the engine.

The coaxial type starter devive 30 constructed as described above, when the output rotational shaft 5 is fully moved forward so that the pinion 8 is meshed with the ring gear of the engine and the engine is started by the rotation of the output rotational shaft 5, the output rotational shaft 5 sometimes receives a shock load due to a change in a pulse-like load produced during the compression stroke of the piston or the like. When the output rotational shaft 5 receives the shock load as described above, it tends to further move forward since it is helically engaged with the clutch inner 12′. A forwardly moving force of the output rotational shaft 5 is transmitted from the spline forming portion 5*a* to the clutch inner 12′ through the front end 12D of the helical spline groove of the clutch inner which forms a stopper. Thereby, the clutch inner 12′ is moved so as to be accompanied forwardly by the output rotational shaft 5 but this moving force is absorbed by the elastic body 16 arranged between the stop portion 12D and the bearing 15.

Figure 5:
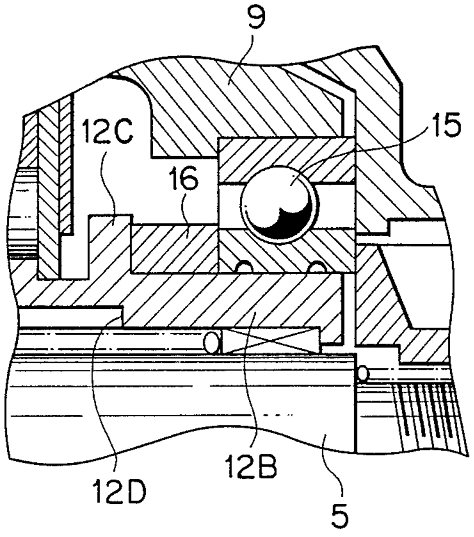
FIG. 5 is a sectional view partly showing a coaxial type starter device according to the second embodiment with a slight modification of one part thereof; and, FIG. 6 is a sectional view showing a conventional coaxial starter device proposed as an improvement over a two-shaft starter device.

While in the aforementioned embodiment, the case where the elastic body 16 is formed by the a leaf spring 16 has been described, it is to be noted that a rubber member 17 as shown in FIG. 5 may be used and further a cylindrical coil spring may also be used to exhibit a similar effect.

According to the above construction, when a high load is applied to the output rotational shaft the latter tends to move forward, the moving force is transmitted to the clutch inner of the overrunning clutch device and the forwardly moving force of the clutch inner is received and absorbed by the elastic body. Therefore, the shock load applied to the output rotational is extremely smoothly received and absorbed, as a consequence of which the ring gear of the engine is prevented from being damaged, and the reliability in terms of strength of the device can be enhanced.

What is claimed is;

1. A coaxial type starter device, comprising:

(a) an armature rotational shaft (3) of an electric motor (2);

(b) an output rotational shaft (5) slidably supported on one and the same axis as said armature rotational shaft and having a pinion (8) on a front end thereof;

(c) an overrunning clutch device (10) provided between said armature shaft and said output shaft, wherein rotation of said armature shaft is transmitted to said output shaft through said overrunning clutch device, and (d) means for absorbing high external loads applied to said output shaft through said pinion, said absorbing means including a deformable elastic member (16) disposed in abutment with an inner race (12; 12') of said overrunning clutch device.

2. A coaxial type starter device as claimed in claim 1, wherein said overrunning clutch device comprises:

a clutch outer race (11) having an inner peripheral surface defining a plurality of cam surfaces at equal intervals;

said clutch inner race arranged internally of said clutch outer race to cooperate with said cam surfaces and define wedgeshaped spaces;-and a plurality of rollers individually arranged in said wedgeshaped spaces and movable in a peripheral direction; said absorbing means including a traversal tube (14) arranged internally of said clutch inner race and said deformable elastic member (16) disposed between an innermost end (12*c*) of said inner race and a flange (14*c*) of said tube for absorbing force in an axial direction of said traversal tube, wherein said traversal tube comprises a first helical spline (14*a*) formed in an inner peripheral surface thereof so as to mesh with said output shaft (5) inserted thereinto, and a second helical spline (14*b*) formed in an outer peripheral surface thereof so as to mesh with said clutch inner race and having a torsional direction reversed from that of said first helical spline, said elastic member being deformed by the axial movement of said tube caused by reaction received when a turning force of said output shaft is transmitted to external gears.

3. A coaxial type starter device as claimed in claim 1, wherein said overrunning clutch device comprises:

a clutch outer race (11') having an inner peripheral surface defining a plurality of cam surfaces of equal intervals;

said clutch inner race arranged internally of said clutch outer race to cooperate with said cam surfaces and define wedgeshaped spaces;

a plurality of rollers individually arranged in said wedgeshaped spaces and movable in a peripheral direction, said absorbing means including a stopper (12D) formed in said clutch inner race for stopping an outward movement of said output shaft, a stop portion (12C) defined in an outer periphery of a forwardly extended portion of said inner race, and said deformable elastic member (16) for absorbing force in an axial direction of said output shaft, wherein said deformable elastic member is arranged between said stop portion and a bearing (15) which is engaged with a frame (9) of said clutch device and supports said extended portion of the inner race.

* * * * *